United States Patent Office 3,207,660
Patented Sept. 21, 1965

3,207,660
PROCESS FOR INHIBITING GROWTH OF MICROORGANISMS
William N. Cannon, Greenwood, Ind., assignor to Eli Lilly and Company, Indianapolis, Ind., a corporation of Indiana
No Drawing. Filed July 12, 1961, Ser. No. 123,449
7 Claims. (Cl. 167—30)

This invention relates to a novel process of antisepsis, to a new and improved method of preparing the antiseptic compounds used therein, and to certain novel, highly useful, soluble antiseptic salts.

It has long been known that phenyliodonium iodides will inhibit microbial growth. However, these phenyliodonium compounds are not sufficiently stable as a class to be suitable for general use and their antimicrobial activity has remained a scientific curiosity for many years.

It is an object of this invention to provide a stable cationic organic bivalent iodine compound of wide utility capable of inhibiting the growth of a broad spectrum of microorganisms. It is a further object of this invention to provide highly water soluble salts of these compounds. It is a still further object of this invention to provide a novel method of preparing these iodine compounds. Other objects of this invention will become apparent from the description which follows.

The novel process of preventing the growth of microorganisms as provided by this invention involves contacting the microorganism habitat with a compound represented by the following Formula I.

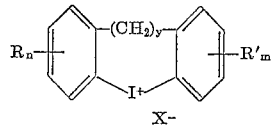

I wherein R and R' are members of the group consisting of halogen, lower alkyl, perfluorinated lower alkyl, lower alkoxy, and nitro; $n$ and $m$ are members of the group consisting of 0, 1, 2 and 3; $y$ is a member of the group consisting of 0, 1, 2 and 3; and X is an anion. When $y$ is 0, the compounds are denominated as dibenziodolium compounds; when $y$ is 1, as dibenziodininium compounds; when $y$ is 2, as dihydrodibenziodopinium compounds; and when $y$ is 3, as dihydrodibenziodocinium compounds.

Radicals exemplary of R and R' include chloro, bromo, iodo, fluoro, methyl, ethyl, propyl, trifluoromethyl, pentafluoroethyl, methoxy, ethoxy, and the like. Anions exemplary of X include sulfate, bisulfate, iodide, chloride, bromide, phosphate, biphosphate, acetate, benzoate, phenate, propionate, butyrate, nitrate, and the like.

Typical compounds represented by the above formula include:

Dibenziodolium 2,4,5-trichlorophenate
2,4-diethoxydibenziodolium citrate
3,7-dinitrodibenziodolium benzoate
3-n-propoxydibenziodolium acetate
2-fluoro-10H-dibenz[b,e]iodininium fluoride
2-(perfluoroethyl)dibenziodolium bromide
2-iodo-11,12-dihydro-10H-dibenz[b,g]iodocinium phenate
Bis(3-chlorodibenziodolium) monohydrogen phosphate
3-chloro-10,11-dihydrodibenz[b,f]iodopinium dihydrogen phosphate The compounds represented by Formula I constitute the preservative of various medicaments, paints, powders, varnishes, cutting oils, ointments, etc., as well as the active ingredients of various oral, parenteral, and topical antimicrobial solutions and ointments useful in the antimicrobial processes of this invention. The high degree of activity of these compounds against a broad spectrum of species of the more commonly encountered microorganisms is illustrated by the data provided in Table I which follows. The information in Table I was obtained by standard agar dilution techniques. In Table I, column 1 gives the name of the test organism and columns 2–19 record the minimum inhibitory concentrations in p.p.m. of the compound listed at the head of the table against the particular microorganism of column 1. A dash indicates that the test organism did not grow sufficiently well to establish an end point and an asterisk indicates that the compound was not tested against that organism.

TABLE I

| Test Organisms | Dibenziodolium lactate | Bis(dibenziodolium) sulfate | Dibenziodolium chloride | Dibenziodolium iodide | Dibenziodolium bisulfate | Dibenziodolium 2,4,5-trichlorophenate | Bis(2-bromodibenz-iodolium) sulfate | Bis(3-nitrodibenziodolium) sulfate | Bis(2-chlorodibenz-iodolium) sulfate | Bis(3-chlorodibenz-iodolium) sulfate | Bis(2,4-dichlorodibenz-iodolium) sulfate | Bis(3,7-dichlorodibenz-iodolium) sulfate | Bis(3,7-dimethyldibenz-iodolium) sulfate | 3,7-dimethoxydibenz-iodolium iodide | 3,7-bis(trifluoromethyl) dibenziodolium iodide | 10H-dibenz[b,e]iodininium chloride | Bis(2-chloro-10H-dibenz-[b,e]iodininium sulfate hydrate | 6,7-dihydro-5H-dibenz-[b,g]iodocinium chloride |
|---|---|---|---|---|---|---|---|---|---|---|---|---|---|---|---|---|---|---|
| 48 HRS. INCUBATION | | | | | | | | | | | | | | | | | | |
| Staphylococcus aureus | 3.13 | 5 | 5 | 10 | 50 | 5 | 5 | 6.25 | 1.56 | 0.78 | 0.78 | 1.56 | 6.25 | 50 | 6.25 | 100 | 25 | 50 |
| Staphylococcus albus | 3.13 | 5 | 5 | 10 | 50 | 10 | 5 | 6.25 | 3.13 | 1.56 | 0.78 | 3.13 | 12.5 | 100 | 6.25 | 100 | 25 | 100 |
| Bacillus subtillis | 1.56 | 5 | <1 | 5 | 10 | 5 | <1 | 6.25 | 1.56 | 0.78 | 0.78 | 1.56 | 6.25 | 50 | 6.25 | 50 | 6.25 | 10 |
| Sarcina lutea | 1.56 | 5 | 5 | 10 | 10 | 5 | <1 | 6.25 | <0.78 | 1.56 | 0.78 | 1.56 | 3.13 | 50 | 1.56 | 50 | 12.5 | 50 |
| Mycobacterium tuberculosis | 0.4 | <1 | <1 | 50 | 5 | <1 | <1 | 1.56 | <0.78 | 0.4 | 0.4 | 0.78 | 0.78 | 6.25 | 6.25 | 5 | 3.13 | 5 |
| Mycobacterium avium | 0.78 | <1 | <1 | 50 | 5 | 5 | <1 | 1.56 | <0.78 | 0.4 | 0.4 | 0.78 | 1.56 | 25 | 6.25 | 5 | 3.13 | 5 |
| Escherichia coli | 6.25 | 5 | 5 | 10 | 50 | 50 | 50 | 1.56 | 3.13 | 1.56 | 3.13 | 3.13 | 6.25 | >100 | 6.25 | 50 | 25 | 100 |
| Proteus vulgaris | 25 | 10 | 10 | 50 | 50 | 10 | 10 | 3.13 | 6.25 | 6.25 | 3.13 | 6.25 | 50 | 100 | 12.5 | 50 | 25 | 100 |
| Pseudomonas aeruginosa | 3.13 | 5 | 5 | 50 | 50 | 10 | 100 | 25 | 3.13 | 3.13 | 25 | 6.25 | >100 | >100 | 12.5 | 100 | 100 | >100 |
| Aerobacter aerogenes | 50 | 50 | 100 | 10 | 100 | 50 | >200 | 25 | 25 | 50 | 12.5 | 100 | >100 | >100 | 100 | >200 | 100 | >100 |
| Klebsiella pneumoniae | 25 | 50 | 50 | 50 | 50 | 50 | 50 | 1.56 | 12.5 | 3.13 | 3.13 | 6.25 | 50 | >100 | 6.25 | >200 | 50 | >100 |
| Salmonella enteritidis | 12.5 | 50 | 50 | 50 | 50 | 50 | 100 | 6.25 | 12.5 | 6.25 | 6.25 | 12.5 | 100 | >100 | 12.5 | >200 | 50 | >100 |
| Shigella paradysenteriae | 6.25 | 10 | 5 | 50 | 50 | 5 | 5 | 6.25 | 3.13 | 3.13 | 0.78 | 3.13 | 25 | 100 | 12.5 | 10 | 100 | 50 |
| Brucella bronchiseptica | 12.5 | 50 | 10 | 50 | 50 | 50 | 50 | 12.5 | 12.5 | 6.25 | 3.13 | 12.5 | 50 | >100 | 6.25 | 100 | 100 | 100 |
| Vibrio metschnikovii | 3.13 | 5 | 5 | 50 | 50 | 10 | 10 | 12.5 | 3.13 | 3.13 | 1.56 | 3.13 | 12.5 | >100 | 6.25 | 50 | 50 | 50 |
| Saccharomyces pastorianus | 25 | 50 | 50 | 100 | 50 | 50 | 100 | 50 | 25 | 50 | 3.13 | 12.5 | 100 | >100 | 12.5 | 50 | 100 | 100 |
| Candida albicans | 0.4 | 5 | <1 | 5 | 10 | 5 | 5 | 12.5 | 1.56 | <0.2 | 1.56 | 0.39 | 12.5 | 100 | 12.5 | 100 | 12.5 | 50 |
| Trichophyton rubrum | 50 | 50 | 50 | 100 | 100 | 50 | 50 | 50 | 100 | 50 | 3.13 | 12.5 | 100 | 100 | 50 | 100 | >100 | >100 |
| Trichophyton interdigitale | 1.56 | 5 | 5 | 50 | 10 | 10 | <1 | 6.25 | 1.56 | 0.4 | 1.56 | 0.78 | 6.25 | 50 | 6.25 | 100 | 25 | 100 |

TABLE I—Continued

| Test Organisms | Dibenziodolium lactate | Bis(dibenziodolium) sulfate | Dibenziodolium chloride | Dibenziodolium iodide | Dibenziodolium bisulfate | Dibenziodolium 2,4,5-trichlorophenate | Bis(2-bromodibenz-iodolium) sulfate | Bis(3-nitrodibenziodolium) sulfate | Bis(2-chlorodibenz-iodolium) sulfate | Bis(3-chlorodibenz-iodolium) sulfate | Bis(2,4-dichlorodibenz-iodolium) sulfate | Bis(3,7-dichlorodibenz-iodolium) sulfate | Bis(3,7-dimethyldibenz-iodolium) sulfate | 3,7-dimethoxydibenz-iodolium iodide | 3,7-bis(trifluoromethyl)dibenziodolium iodide | 10H-dibenz[b,e]iodininium chloride | Bis(2-chloro-10H-dibenz-[b,e]iodininium sulfate hydrate | 6,7-dihydro-5H-dibenz-[b,g]iodocinium chloride |
|---|---|---|---|---|---|---|---|---|---|---|---|---|---|---|---|---|---|---|
| 72 HRS. INCUBATION | | | | | | | | | | | | | | | | | | |
| Agrobacterium tumefaciens | 6.25 | (*) | (*) | (*) | 50 | 10 | 50 | 12.5 | 6.25 | 12.5 | 12.5 | 25 | 50 | >100 | 25 | 50 | 50 | 100 |
| Corynebacterium michiganese | 1.56 | (*) | (*) | (*) | 5 | 5 | <1 | 6.25 | 1.56 | 1.56 | 0.78 | 0.39 | 3.13 | 50 | 6.25 | 5 | 3.13 | 5 |
| Erwinia amylovora | 12.5 | 50 | 50 | 50 | 100 | 50 | 10 | 12.5 | 12.5 | 12.5 | 3.13 | 12.5 | 100 | >100 | 25 | — | 50 | >100 |
| Pseudomonas solanacearum | 3.13 | (*) | (*) | (*) | 50 | 5 | — | 6.25 | 1.56 | 6.25 | — | — | 50 | 100 | 12.5 | 10 | 50 | 50 |
| Xanthomonas phaseoli | 3.13 | 50 | 5 | 50 | 10 | 10 | — | 12.5 | 3.13 | 1.56 | 0.78 | — | 50 | >100 | 12.5 | — | 50 | 10 |
| Alternaria solani | 6.25 | 50 | 50 | 50 | 100 | 10 | 100 | 6.25 | 25 | 6.25 | 1.56 | 50 | 50 | 50 | 50 | >200 | >100 | 50 |
| Aspergillus niger | >100 | 100 | 200 | 200 | 200 | 50 | >200 | 100 | 100 | >100 | 25 | >100 | >100 | >100 | >100 | >200 | >100 | >100 |
| Botrytis cinerea | — | (*) | (*) | (*) | 50 | 50 | 50 | 12.5 | 1.56 | — | 0.78 | 12.5 | 3.13 | >100 | 12.5 | 50 | 12.5 | 50 |
| Ceratostomella ulmi | 1.56 | 5 | 5 | 10 | 10 | 5 | 5 | 3.13 | 1.56 | 1.56 | 1.56 | 3.13 | 3.13 | 50 | 12.5 | 10 | 12.5 | 50 |
| Colletotrichum pisi | 50 | 50 | 50 | 50 | 50 | 50 | 50 | 25 | 25 | 50 | 1.56 | 100 | 100 | >100 | 50 | >200 | >100 | >100 |
| Endoconidiophora fagacearum | 50 | 100 | 100 | 100 | 100 | 50 | 100 | 25 | 50 | 100 | 12.5 | 100 | >100 | >100 | >100 | 200 | >100 | >100 |
| Fusarium moniliforme | 100 | >100 | 100 | 100 | 200 | 50 | 200 | 25 | 50 | 50 | 12.5 | >100 | >100 | >100 | >100 | >200 | >100 | >100 |
| Glomerella cingulata | 12.5 | 50 | 50 | 50 | 50 | 50 | 100 | 25 | 6.25 | 25 | 3.13 | 25 | >100 | >100 | >100 | >200 | >100 | >100 |
| Helminthosporium sativum | 25 | (*) | (*) | (*) | 50 | 50 | 100 | 50 | 25 | 50 | 12.5 | 50 | 12.5 | >100 | 25 | 100 | 100 | 100 |
| Penicillium expansum | 25 | 50 | 50 | 50 | 50 | 50 | 100 | 25 | 25 | 50 | 3.13 | 50 | 100 | >100 | >100 | >200 | >100 | >100 |
| Phoma pigmentovora | 12.5 | (*) | (*) | (*) | 50 | 50 | 50 | 50 | 6.25 | 3.13 | 3.13 | 25 | 100 | 50 | 50 | 200 | >100 | >100 |
| Polyporus ostreatus | 6.25 | (*) | (*) | (*) | 50 | 10 | 50 | 12.5 | 6.25 | 6.25 | 1.56 | 25 | 12.5 | 50 | 25 | — | 50 | 50 |
| Pullularia sp | 25 | 50 | 50 | 100 | 100 | 50 | 200 | 50 | 25 | 50 | 3.13 | 100 | >100 | >100 | 50 | >200 | >100 | >100 |
| Verticillium albo-atrum | 25 | 100 | 100 | 50 | 100 | 50 | 200 | 50 | 25 | 100 | 3.13 | 100 | >100 | >100 | 50 | >200 | >100 | >100 |

The heterocyclic iodine compounds represented by Formula I when used in the processes of this invention are capable of controlling the growth of a large variety of microorganisms in addition to those listed in Table I. Illustratively, dibenziodolium 2,4,5-trichlorophenate is effective in controlling schistosomiasis in mice when administered orally at the rate of 1 mg./kg. per day. Bis(2-chloro-10H-dibenz[b,e]iodininium) sulfate hydrate is active in vitro against *Syphacia ovelata* at a dilution of 16.6 mcg./ml. The dibenziodolium compounds have also shown in vitro activity against *Trichomonas vaginalis* and *Endamoeba histolytica* at a dilution of 2 mcg./ml.

The above microorganisms plus those listed in Table I are still only illustrative of the large group of pathogenic and nonpathogenic aerobic and anaerobic bacteria, as well as various fungi, yeasts, amoebae, schistosomes, worms, algae, etc., which can be controlled by the application to their habitat of an effective concentration of a heterocyclic iodine compound.

In addition to having a high degree of effectiveness against a wide variety of pathogenic and nonpathogenic organisms, the dibenziodolium, dibenziodininium, dihydrodibenziodopinium, and dihydrodibenziodocinium salts set forth above are advantageous in that they possess a greater margin of safety between their antiseptic and toxic doses than is found with a majority of the effective antiseptics of the prior art. Table II which follows lists the toxicity of representative compounds represented by Formula I in terms of $LD_{50}$ for mice in mg./kg.

TABLE II

| Compound: | Oral $LD_{50}$ for mice in mg./kg. |
|---|---|
| Dibenziodolium lactate | 12.5 |
| Bis(dibenziodolium) sulfate | 8.75±0.57 |
| Bis(3-nitrodibenziodolium) sulfate | 57.20±8.9 |
| Bis(2-chlorodibenziodolium) sulfate | 8–10 |
| Bis(3-chlorodibenziodolium) sulfate | 25 |
| Bis(2,4-dichlorodibenziodolium) sulfate | 94.58±11.07 |
| Bis(3,7-dichlorodibenziodolium) sulfate | 21.32±3.2 |
| Bis(3,7-dimethyldibenziodolium) sulfate | 60 |
| 3,7-dimethoxydibenziodolium iodide | 200 |
| Bis(2-chloro-10H-dibenz[b,e]iodininium sulfate hydrate | 110.4±13.2 |

As set forth above, the processes of this invention comprise the use of a heterocyclic iodine compound represented by Formula I in preventing or arresting the growth of microorganisms by its application to the microorganism habitat. The compounds can be employed in solution, either in water or in an organic solvent, in both aqueous and nonaqueous suspensions such as lotions, ointments, creams, or pastes, or in suspension or solution in a paint or varnish. The compounds can also be used in dry form as in a dusting powder, or in any other way that antiseptics and preservatives are employed. The predominant process employing the compounds of Formula I as antiseptics, however, is one involving aqueous systems; as for example, when the compounds are employed in aqueous emulsions to preserve machine tool cutting oils or in cooling water towers to check algal growth.

Solutions or ointments containing the compounds can also be employed in treating minor cuts and abrasions to prevent infection, and solutions or dusts can be sprayed or dusted on living plants or on corn silage to check the growth of various fungi. The compounds are also useful in treating seeds prior to planting in order to check the growth of fungi etc. which cause "damping" or other diseases of seedlings.

The treatment of diseases of mammals is also included within the scope of this invention and, for this purpose, the compounds can be administered as solutions, either orally or parenterally, for the treatment of amoebiasis, schistosomiasis etc. The compounds can also be administered for the same purpose in the form of pills or filled capsules for oral use.

The above processes are for illustrative purposes only, and it will become apparent to those skilled in the art that there are many other similar processes employing compositions having a heterocyclic iodine compound as the active ingredient which can be carried out to prevent microbial growth according to the teaching of this invention.

The heterocyclic iodine compounds useful in the processes of this invention are far more stable than the open-chain iodonium compounds previously known. When, for example, bis(dibenziodolium) sulfate is incorporated into an ointment as a preservative and the ointment heated at 60° C. for 48 hours, there is virtually no diminution of microbial activity. Under the same conditions, an open-chain diphenyliodonium compound such as diphenyliodonium chloride treated in the same fashion is completely decomposed by heating at 60° C. for 48 hours, and the ointment originally containing the iodonium compound has no antimicrobial action.

Two alternative methods are available for the preparation of the compounds represented by Formula I above. The first of these methods has been described in the prior art, and its application in the synthesis of compounds represented by Formula I is set forth in Reaction A below.

REACTION SCHEME A

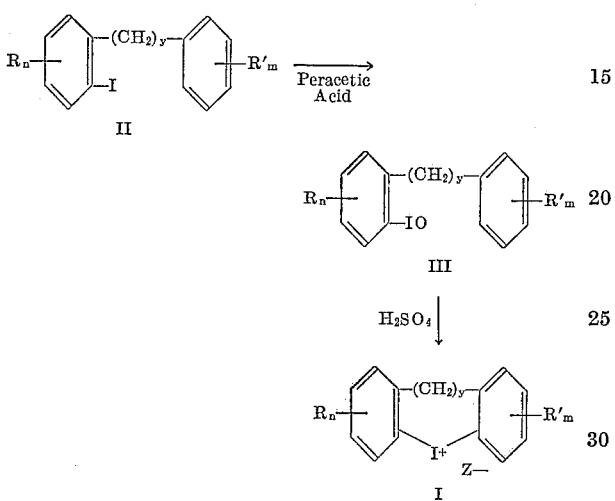

wherein R, R', n, m and y have the same significance as hereinabove, and Z is sulfate/2 or bisulfate.

According to Reaction Scheme A, the o-iodobiphenyl or o-iodobiphenyl alkane (II) is treated with peracetic acid to yield the corresponding iodoso compound (III), which compound is in turn transformed by treatment with sulfuric acid into a heterocyclic iodine compound in the form of a sulfate salt (I) useful in the processes of this invention.

The procedure outlined in Reaction Scheme A, while eminently suitable for the preparation of compounds represented by the above formula on a laboratory scale, suffers from a serious disadvantage in that peracetic acid, the reagent employed to form the iodoso compound, is an extremely powerful oxidizing agent and has been the cause of many explosions in the past. In particular, peracetic acid is both difficult and dangerous to handle in a commercial scale reaction. I have now found that a second method is available for the synthesis of dibenziodolium sulfates and related heterocyclic iodine compounds, which method entirely avoids the use of peracetic acid. This novel procedure which forms a second aspect of this invention is illustrated in Reaction Scheme B below.

REACTION SCHEME B

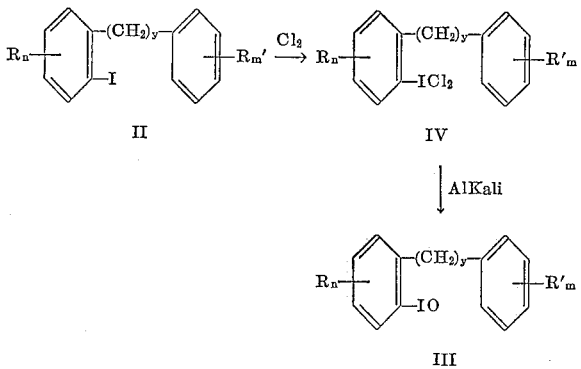

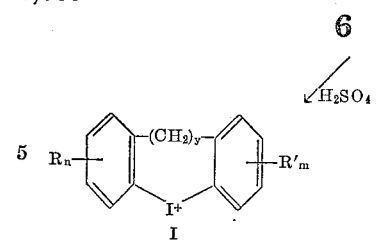

wherein R, R', n, m and y have the same significance as hereinabove, and Z is sulfate/2 or bisulfate.

According to Reaction Scheme B, the iodo starting material of Reaction Scheme A (II) is chlorinated to form the iodo dichloride compound (IV). Treatment of the iodo dichloride with alkali yields the corresponding iodoso compound (III), which can in turn be transformed to the desired heterocyclic iodine compound (I) by treatment with sulfuric acid or other strong Lewis acid.

A third method is available for the preparation of the dibenziodolium iodides and related heterocyclic iodine compounds. These compounds can be prepared by a method amply illustrated in the prior art. According to this procedure, an o,o'-diaminobiphenyl is diazotized to yield a tetrazonium salt, which, when decomposed in the presence of an aqueous solution of potassium iodide, yields a dibenziodolium iodide. The other iodine-containing ring systems represented by the above formula are prepared in analogous fashion from the corresponding diamino starting material.

The preparation of compounds represented by the above formula by Reaction Schemes A or B is illustrated by the following specific examples:

*Example 1.—Preparation of bis(2,4-dichlorodibenziodolium) sulfate*

10 g. of 2-iodo-3,5-dichlorobiphenyl were dissolved in about 50 ml. of chloroform and the solution was cooled while being stirred to about 0° C. The temperature of the solution was maintained in the range 0–5° C. while chlorine gas was bubbled into the solution until the solution was saturated. 300 ml. of hexane were added and the bubbling of chlorine into the solution was continued. Yellow crystals of 2-iodo-3,5-dichlorobiphenyl dichloride precipitated and were separated by filtration. The crystals melted at about 103–105° C.

42 g. of 2-iodo-3,5-dichlorobiphenyl dichloride were mixed with 100 g. of crushed ice and 100 ml. of water. 10 g. of sodium hydroxide were dissolved in 100 ml. of water and the solution was added to the solution of the 2-iodo-3,5-dichlorobiphenyl dichloride with stirring over a period of about 30 minutes. Stirring was continued for another 4 hours while the reaction temperature was allowed to reach ambient room temperature. During this time the yellow crystals of 2-iodo-3,5-dichlorobiphenyl dichloride were replaced by white crystals of 2-iodoso-3,5-dichlorobiphenyl, which latter crystals were separated by filtration. The precipitate was dried as much as possible on the filter paper and was then dissolved while still slightly damp in about 300 ml. of glacial acetic acid. The solution was filtered to remove impurities and was then cooled to below 5° C., at which temperature it was held while 25 ml. of 18 M sulfuric acid were added in dropwise fashion over a 1.5-hour period. Bis(2,4-dichlorodibenziodolium) sulfate thus formed began to precipitate before all of the sulfuric acid had been added. Stirring was continued while the reaction mixture was allowed to warm up to ambient room temperature, at which temperature it was stirred for another 14 hours. The bis(2,4-dichlorodibenziodolium) sulfate precipitate was separated by filtration. The separated precipitate was washed with water and was then slurried in benzene, thus removing some yellow color and leaving a white crystalline precipitate of bis(2,4-dichlorodibenziodolium) sulfate, which was again separated by filtration. The purified compound melted at about 224–225° C.

Other Lewis acids such as polyphosphoric acid and phosphorous oxychloride can be used in place of sulfuric acid in the above ring-closure step to yield the corresponding dibenziodolium phosphate and chloride.

*Example 2.—Preparation of bis(dibenziodolium) sulfate*

7.4 g. of 2-iodosobiphenyl prepared from 2-iodobiphenyl dichloride by the procedure of Org. Syn. Col., III, 483 were dissolved in 50 ml. of glacial acetic acid. The solution was chilled to about 15° C., and 5 ml. of 18 M sulfuric acid were added in dropwise fashion to the solution over a 15-minute period. The reaction mixture was kept at ambient room temperature for about 16 hours. The reaction mixture was cooled to about 10° C. and 250 ml. of an ice-water mixture was added.

Dibenziodolium bisulfate precipitated and the precipitate was separated by filtration. The precipitate was slurried in 100 ml. of benzene and was refiltered, thus yielding dibenziodolium bisulfate as a white crystalline solid melting at about 264–267° C. with decomposition.

*Example 3.—Preparation of bis(2-chloro-dibenziodolium) sulfate*

A solution of peracetic acid was prepared as follows: 25 ml. of 30 percent hydrogen peroxide were added dropwise with stirring to 100 ml. of acetic anhydride maintained at about 0° C. After the addition had been completed, the mixture was stirred at about 0° C. until homogeneous. The peracetic acid thus formed was then removed from the cooling bath and warmed to ambient room temperature. 10 g. of 2-iodo-5-chlorobiphenyl were dissolved in about 20 ml. of acetic anhydride and this solution was added dropwise with stirring to 50 ml. of the above peracetic acid solution. The reaction mixture was maintained at ambient room temperature for about 12 hours and was then cooled to about 5° C. 10 ml. of 18 M sulfuric acid were added dropwise with stirring while maintaining the temperature of the reaction mixture in the range 5–10° C. After the addition of the sulfuric acid had been completed, the reaction mixture was removed from the cooling bath, and was warmed to ambient room temperature where it was kept for about 5 hours. 200 ml. of cold water were added and the resulting mixture was stirred for about one hour and was then filtered to separate the precipitate of bis(2-chlorodibenziodolium) sulfate formed in the above reaction. Two recrystallizations of the precipitate from a mixture of dimethylformamide and water yielded purified bis(2-chlorodibenziodolium) sulfate melting at about 247–249° C.

Other compounds prepared by the above procedure include:

Bis(2,4-dichlorodibenziodolium) sulfate, prepared from 2-iodo-3,5-dichlorobiphenyl, melts at about 224–225° C. with decomposition after recrystallization from a water-dimethylformamide solvent mixture.

Bis(2-bromodibenziodolium) sulfate, prepared from 2-iodo-5-bromobiphenyl, melts at about 263–266° C. after recrystallization from an ethanol-water solvent mixture.

Bis(3,7-dichlorodibenziodolium) sulfate, prepared from 2-iodo-4,4'-dichlorobiphenyl, melts at about 274–275° C.

Bis(3-chlorodibenziodolium) sulfate, prepared from 2-iodo-4-chlorobiphenyl, melts at about 249–251° C.

*Example 4.—Preparation of bis(3,7-trifluoromethyl) dibenziodolium iodide*

Following the procedure of Searle and Adams, J. Am. Chem. Soc., 55, 1653 (1933), a slurry was prepared containing 14.7 g. of 2,2'-diamino-4,4'-bis(trifluoromethyl) biphenyl in 50 ml. of 12 N hydrochloric acid and 50 ml. of water. The slurry was cooled to a temperature in the range 0–5° C. and was maintained there while a solution of 8 g. of sodium nitrite in 10 ml. of water was added in dropwise fashion. After the addition had been completed, the tetrazotization mixture was stirred for about 30 minutes, after which time a solution of 26 g. of sodium iodide in 50 ml. of water was added also in dropwise fashion. The reaction mixture was allowed to warm up to ambient room temperature and was then heated at about 100° C. for about 2 minutes. The reaction mixture was cooled, thereby causing the precipitation of bis(3,7-trifluoromethyl)dibenziodolium iodide as a coal black solid. The solid precipitate was separated by filtration and was washed with copious quantities of cold water. The precipitate was slurried in about 100 ml. of ethanol and was refiltered. This operation was repeated twice more, thus providing a lemon-yellow colored compound melting at about 268–270° C. with decomposition. Recrystallization of this compound from a dimethylformamide-water solvent mixture yielded bis(3,7-trifluoromethyl)-dibenziodolium iodide as a solvate with dimethylformamide. Melting point: 274–276° C.

Reaction Schemes A and B above yield as their final product a sulfate or bisulfate salt. Other salts can be prepared from the above salts by methods well known to the art, such as a metathetic reaction. For example, an aqueous solution of bis(dibenziodolium) sulfate can be treated with an aqueous solution of barium chloride or barium nitrate, thus forming dibenziodolium nitrate or chloride and a readily separable insoluble precipitate of barium sulfate. Alternatively, barium hydroxide can be reacted with bis(dibenziodolium) sulfate to yield an insoluble precipitate of barium sulfate plus a solution of dibenziodolium hydroxide. Neutralization of the hydroxide with any suitable acid yields a dibenziodolium salt in which the anion of the acid becomes the anion of the dibenziodolium salt.

Despite their extremely high order of antimicrobial activity, certain of the compounds preparable by one of the above procedures are not sufficiently soluble in water to attain an antimicrobial concentration against all affected species of organisms. In particular, the iodide salts are quite insoluble and are used chiefly in the form of powders or dusts and not as aqueous solutions. Furthermore, when it is desired to prepare a concentrate adapted for later dilution with larger volumes of water in order to attain a satisfactory antimicrobial level, the more common salts such as the sulfate, bisulfate, and phosphate salts are not sufficiently soluble in water to form useful concentrates. In order to furnish a more soluble group of salts of the heterocyclic iodine compounds represented by Formula I above, this invention provides a group of salts of the dibenziodolium cation, of the dibenziodininium cation, of the dihydrodibenziodopinium cation, and of the dihydrodibenziodocinium cation which, unexpectedly, possess a far greater solubility in water than would have been predicted by a consideration of their structures. These highly soluble salts are those in which the anion is derived from an α-hydroxy aliphatic carboxylic acid or dicarboxylic acid; as for example, lactic, citric, gluconic, glucoheptonic, and tartaric acids. These novel soluble salts can be represented by Formula II below.

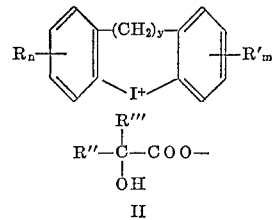

II wherein R, R', $n$, $m$ and $y$ have the same significance as hereinabove; R'' is hydrogen or lower alkyl; and R''' is lower alkyl, lower alkenyl, carboxy-substituted lower alkyl, or α-hydroxy carboxy-substituted lower alkyl. The alkyl groups R'' and R''' can be hydroxylated.

This preferred group of salts is prepared in the same manner as outlined above except that lactic, or tartaric, or citric acid is used to neutralize the dibenziodolium hydroxide, dibenziodininium hydroxide, dihydrodibenziodopinium hydroxide, or dihydrodibenziodocinium hydroxide.

Table III below gives the solubilities of a representative α-hydroxy aliphatic carboxylic acid salt of a heterocyclic iodine compound represented by Formula I as well as the solubilities of the sulfate, phosphate, and other more common salts of representative heterocyclic iodine compounds.

TABLE III

| Salt: | Solubility in mg./ml. of water at 25° C. |
|---|---|
| Dibenziodolium lactate | 403.2 |
| Dibenziodolium sulfate | 1.5 |
| Dibenziodolium acetate | 29.2 |
| Dibenziodolium dihydrogen phosphate | 4.5 |
| Dibenziodolium 2,4,5-trichlorophenate | 0.05 |
| Bis(2,4-dichlorodibenziodolium) sulfate | 0.11 |

The preparation of various salts from the corresponding sulfate or bisulfate salt provided by Examples 1–4 above is illustrated by the following specific examples:

*Example 5.—Preparation of dibenziodolium nitrate*

100 g. of dibenziodolium bisulfate were mixed with 2 l. of water and the mixture was heated to refluxing temperature. A solution of 60 g. of sodium nitrate in 100 ml. of water was added rapidly to the refluxing solution. The reaction mixture was cooled while being stirred to ambient room temperature. Filtration of the mixture yielded 73 g. of dibenziodolium nitrate melting at about 242–244° C.

*Example 6.—Preparation of dibenziodolium lactate*

10.2 g. of bis(dibenziodolium) sulfate was dissolved in 1,000 ml. of hot water. 6.63 g. of barium hydroxide octahydrate were dissolved in a minimum volume of water and this solution was added to the solution of the iodolium compound. An immediate precipitate of barium sulfate came down. The reaction mixture was cooled with stirring to insure complete precipitation of barium sulfate, which was then separated by filtration. The pH of the solution was adjusted from about 12 to about 3 by slow addition of an 85 percent aqueous lactic acid solution. Evaporation of the aqueous solvent in vacuo yielded dibenziodolium lactate as a residue. Recrystallization of the residue from an ethanol-ether solvent mixture yielded dibenziodolium lactate melting at about 156–159° C.

Dibenziodolium glycolate was prepared from glycolic acid by the above procedure and melted at about 150–152° C.

Bis(dibenziodolium) sulfate was converted to dibenziodolium citrate by the above procedure but using citric acid in place of lactic acid. The compound melted with decomposition at about 176–178° C.

*Analysis.*—Calc.: I, 26.99. Found: I, 26.96.

Bis(dibenziodolium) sulfate was converted to dibenziodolium dihydrogen phosphate by the above procedure using phosphoric acid in place of lactic acid and melted at about 272–274° C.

*Analysis.*—Calc.: I, 35.75. Found: I, 35.55.

Dibenziodolium acetate was prepared from dibenziodolium bisulfate by the above procedure using acetic acid in place of lactic acid and melted with decomposition in the range 180–190° C.

*Analysis.*—Calc.: I, 37.53. Found: I, 36.86.

*Example 7.—Alternate preparation of dibenziodolium lactate*

A solution containing 0.1 mole of barium lactate was prepared from lactic acid and barium hydroxide. 9.9 g. of dibenziodolium bisulfate were added to the barium lactate solution with stirring. The stirring was continued overnight. The precipitated barium sulfate was separated by filtration. The filtrate containing dibenziodolium lactate was evaporated to dryness, leaving the desired compound as a white crystalline residue. The compound was purified by recrystallization from an ethanol-ether solvent mixture.

2,4-dichlorodibenziodolium lactate was prepared by the above procedure but using bis(2,4-dichlorodibenziodolium) sulfate in place of dibenziodolium bisulfate as the starting material.

*Example 8.—Preparation of dibenziodolium 2,4,5-trichlorophenate*

6.54 g. of bis(dibenziodolium) sulfate were dissolved in 500 ml. of hot water. 3.96 g. of 2,4,5-trichlorophenol were dissolved in 30 ml. of 0.7 N sodium hydroxide solution. This solution was added rapidly to the solution of the bis(dibenziodolium) sulfate. An immediate yellow precipitate formed. The reaction mixture was cooled to about 0° C. and was filtered. Dibenziodolium 2,4,5-trichlorophenate thus prepared melted at about 181–182° C. with decomposition after recrystallization from a mixture of dimethylformamide and water.

*Analysis.*—Calc.: C, 45.99; H, 2.12. Found: C, 45.39; H, 2.38.

Intermediate halogenated 2-iodobiphenyls useful as starting materials in the above examples are prepared from the corresponding 2-amino compounds by diazotization and decomposition of the diazonium salt with aqueous potassium iodide. Illustrative preparative procedures include the following:

PREPARATION I.—2-IODO-5-BROMOBIPHENYL 62 g. of 2-amino-5-bromobiphenyl were dissolved in a mixture containing 25 ml. of 12 N hydrochloric acid and 250 ml. of water. A solution of 20.7 g. of sodium nitrite in 50 ml. of water were added slowly to the amine solution, which was maintained in the temperature range 0–5° C. The solution containing 2-phenyl-4-bromobenzenediazonium chloride formed in the above reaction was poured with stirring into a solution of 62.3 g. of potassium iodide dissolved in 125 ml. of water. After the initial vigorous evolution of nitrogen had subsided, the reaction mixture was warmed to about 50° C. 2-iodo-5-bromobiphenyl thus formed was extracted into benzene. The benzene solution was washed with water and was dried. The benzene was removed by evaporation in vacuo, leaving 2-iodo-5-bromobiphenyl as a residue. Distillation of the residue yielded fractions boiling in the range 125–140° C. at 0.5 mm. of mercury. Redistillation of the combined fractions yielded 2-iodo-5-bromobiphenyl boiling in the range 128–132° C. at a pressure of about 0.5 mm. of mercury; $n_D^{25} = 1.679$.

2-iodo-5-chlorobiphenyl was prepared from 2-amino-5-chlorobiphenyl by the above procedure. Boiling point: 110° C. at a pressure of about 0.05 mm. of mercury; $n_D^{25} = 1.660$.

PREPARATION II.—2-IODO-4,4'-DICHLOROBIPHENYL

Following the procedure of Preparation I, 2-amino-4,4'-dichlorobiphenyl was diazotized and the diazonium salt was decomposed by pouring it into a solution of potassium iodide, thus forming 2-iodo-4,4'-dichlorobiphenyl. The compound was isolated and purified by the procedure of Preparation I. Distallation of 2-iodo-4,4'-dichlorobiphenyl thus prepared yielded three fractions boiling in the range 116–136° C. at a pressure of about 0.05 mm. of mercury. Redistillation of the combined fractions yielded purified 2-iodo-4,4'-dichlorobiphenyl boiling in the range 135–136° C. at a pressure at about 0.1 mm. of mercury.

PREPARATION III.—2-IODO-3,5-DICHLOROBIPHENYL 119 g. of 2-amino-3,5-dichlorobiphenyl prepared according to the method of Scarborough and Water, J. Chem. Soc., 1927, 92 were slurried in 1000 ml. of water. 147 g. of 18 M sulfuric acid were added slowly thereto, thus forming the sulfate salt of the amine. The slurry was chilled to a temperature in the range 0–5° C., and a solution of 41.4 g. of sodium nitrite in 100 ml. of water was added to the cooled amine sulfate slurry in dropwise fashion. After the addition had been completed, the reaction mixture containing the above-prepared diazonium sulfate was stirred in the cold for about 30 minutes. The cold solution was filtered and the filtrate was poured, again with stirring, into a solution of 160 g. of potassium iodide in 500 ml. of water. Evolution of nitrogen was noticed immediately. After the addition of the chilled diazonium salt solution had been completed, the reaction mixture was warmed to about 100° C. for about 2 hours and was then cooled. 2-iodo-3,5,-dichlorobiphenyl formed in the above reaction was extracted with 500 ml. of ether. The ether extract was separated and was washed successively with water, 10 percent aqueous sodium thiosulfate, water, 10 percent sodium hydroxide, and water. The ether layer was dried and the ether removed therefrom by evaporation in vacuo. Distillation of the residue yielded 2-iodo-3,5,-dichlorobiphenyl boiling in the range 132–135° C. at a pressure of about 0.05 mm. of mercury; $n_D^{25}=1.668$. The distillate solidified upon standing. 2-iodo-3,5-dichlorobiphenyl melted at about 42–45° C.

*Analysis.*—Calc.: 41.30; H, 2.01; I, 36.36. Found: C. 41.47; H, 2.15; I, 36.02.

I claim:

1. The process of inhibiting the growth of microorganisms which comprises contacting a microorganism habitat with an effective amount of a compound represented by the following formula:

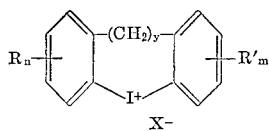

wherein R and R' are members of the group consisting of halogen, lower alkyl, perfluorinated lower alkyl, lower alkoxy, and nitro; $n$ and $m$ are numbers from 0 to 3; $y$ is a number from 0 to 3; and X is an anion.

2. The process of preventing the growth of microorganisms which comprises contacting a mircroorganism habitat with a composition capable of inhibiting the growth of said microorganisms comprising an inert diluent and, as a toxic ingredient, an effective amount of a compound represented by the formula:

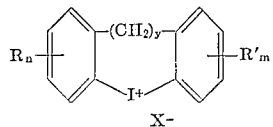

wherein R and R' are members of the group consisting of halogen, lower alkyl, perfluorinated lower alkyl, lower alkoxy, and nitro; $n$ and $m$ are numbers from 0 to 3; $y$ is a number from 0 to 3; and X is an anion.

3. The process of claim 2 wherein the toxic ingredient is bis(dibenziodolium) sulfate.

4. The process of claim 2 wherein the toxic ingredient is bis(3-chlorodibenziodolium) sulfate.

5. The process of claim 2 wherein the toxic ingredient is bis(2,4-dichlorodibenziodolium) sulfate.

6. The process of claim 2 wherein the toxic ingredient is bis(3,7-dichlorodibenziodolium) sulfate.

7. The process of claim 2 wherein the toxic ingredient is dibenziodolium 2,4,5-trichlorophenate.

References Cited by the Examiner

UNITED STATES PATENTS

| | | | |
|---|---|---|---|
| 2,878,293 | 3/59 | Kinzer | 260—607 |
| 2,943,016 | 6/60 | Rosen et al. | 167—30 |
| 2,945,059 | 7/60 | Shunk et al. | 260—535 |
| 2,946,818 | 7/60 | Anagnostopoulos et al. | 260—535 |
| 2,965,535 | 12/60 | Birum | 167—30 |

OTHER REFERENCES

Chem. Abst., vol. 39, page 5938 (1945).

Collette et al.: J.A.C.S., vol. 78, pages 3819–20 (1956).

Freelander et al.: Chemical Abstracts, vol. 41, page 2115 (1947).

Irving et al.: Chemical Abstracts, vol. 54, 20443(b), (1960).

Masson et al.: J. Chem. Soc. (London) 1937, pages 1,718–23.

Sandin et al.: J.A.C.S., vol. 74, pages 274–275, January, 1952.

Wasylewsky et al.: J.A.C.S., vol. 72, pages 1038–1039, February, 1950.

JULIAN S. LEVITT, *Primary Examiner.*

LEON ZITVER, LEWIS GOTTS, *Examiners.*